Aug. 3, 1937.   R. W. KRITZER   2,088,796
COOLING UNIT AND COMBINATION AIR CIRCULATOR AND DRIP PAN FOR THE SAME
Filed Feb. 23, 1934   2 Sheets-Sheet 1

Inventor:
Richard W. Kritzer

Patented Aug. 3, 1937

2,088,796

UNITED STATES PATENT OFFICE 2,088,796

COOLING UNIT AND COMBINATION AIR CIRCULATOR AND DRIP PAN FOR THE SAME

Richard W. Kritzer, Chicago, Ill.

Application February 23, 1934, Serial No. 712,448

7 Claims. (Cl. 62—103)

My invention relates to a new and useful form of cooling unit, air circulator and drip pan means for cooling units used to set up a convection circulation of air in refrigerated compartments.

This application relates to my application Serial Number 715,800 filed March 16, 1934, and to the joint application Richard W. Kritzer and Anthony F. Hoesel Serial Number 17,598 filed April 15, 1935.

Most of the baffles and drip pans in common use are of the L shaped type, which tend to restrict the air flow passing from the cooling unit, since with a cooling unit of appreciable width, unless the bottom leg of the baffled drip pan has a great pitch, the cooled air has to move horizontally for an appreciable distance. This horizontal movement toward the spill edge of the drip pan can only be attained by a build up of the static head of the air due to its being cooled, and increased in weight per unit volume due to the cooling shrinkage.

The build up of the static head automatically throttles the convection circulation of the air in the compartment, and reduces the mean temperature difference between the circulated air and the cooling unit, thereby decreasing the maximum heat absorption of the cooling unit.

An object of the invention is to attain the maximum possible heat absorption and convection circulation of air under given conditions of temperature differences between the air and the cooling unit.

Another object of the invention is to provide a definite convection circulation of air in all parts of the refrigerated compartment.

Another object of the invention is to take advantage of the natural air movements due to thermal changes and inertia of movement.

A further object of the invention is to provide means whereby the drip from the cooling unit is entrapped and conducted to a drain.

Figure 1:
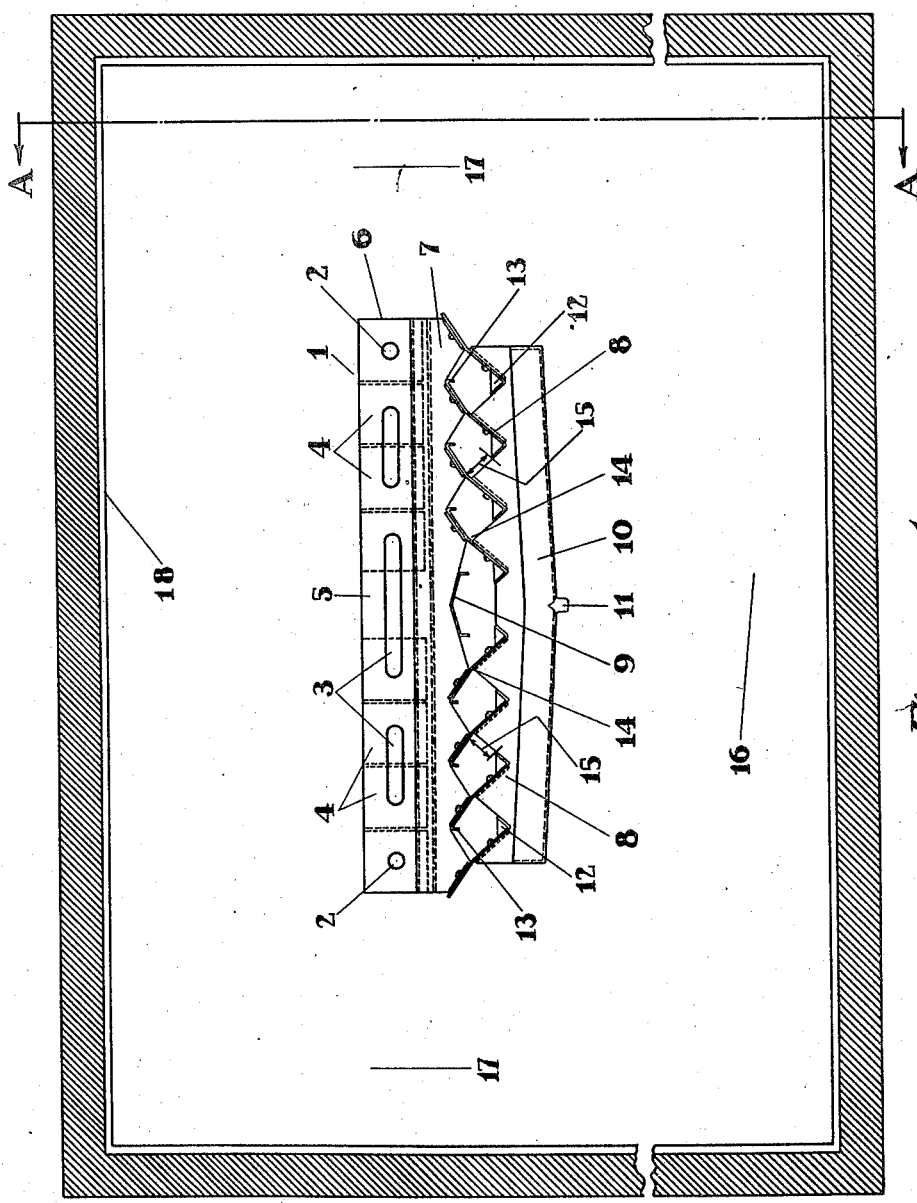
Figure 1 is an end elevational view of a refrigerated compartment containing a cooling unit and combination air circulator and drip pan embodying the invention.
Figure 2:
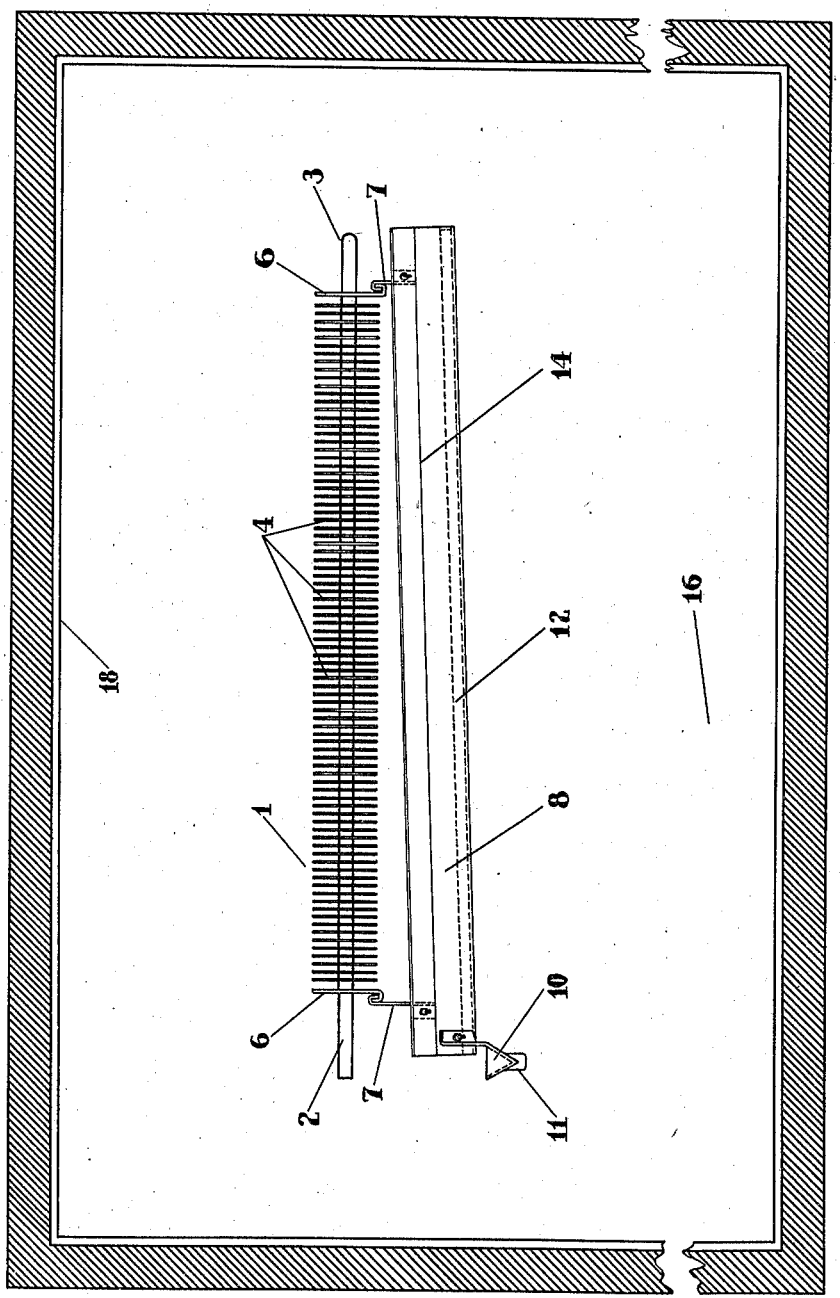
Figure 2 is an elevational view along line A—A of Figure 1.

Referring to Figures 1 and 2, the cooling unit 1 is comprised of parallel courses of a refrigerant conduit 2, the parallel courses being joined by return bends 3. A refrigerant is circulated through the conduit 2 by any suitable means, not shown. The parallel courses of the conduit 2 have a multiplicity of fin plates 4 mounted thereon in order to increase the effective heat transfer. In the center of the cooling unit 1 is a space 5. The end tie plates 6 serve to keep the parallel courses of the conduit 2 in alignment. Suspended from the end tie plates 6 are spacer-supports 7 upon which are mounted louvres 8 and deflector 9 in spaced relationship. Suspended from the louvres 8 is a collector trough 10 having a connection 11, which may be connected to a sewer. The channels 12 of the louvres 8 spill into the collector trough 10. The louvres 8 have, at their upper end, a turned lip 13, and a vertical line from this turned lip passes through the trough 12 of the adjacent louvre 8. Intermediate the troughs 12 and lips 13 of the louvres 8 is a bend 14 providing an increased space at 15 over that which would exist without this bend.

Reference to Figures 1 and 2 shows that the spacer-supports 7 have turned lips engaging the upper side of louvres 8, which are bolted or riveted thereto. It will be further noted that any drippage from the spacer-supports 7 must always drop into the channels 12 of the louvres 8, instead of being allowed to reach the underside of the louvres 8, as would occur, if the spacer-support 7 engaged the under side of the louvres 8.

The above combination is substantially centered in a compartment 16, providing warm air passages 17 at each side of the cooling unit 1 suspended a certain distance from the ceiling 18 of the compartment 16.

Having described the component parts of the invention, I shall now describe their operation.

Assuming a refrigerant being circulated in the conduit 2, the cooling unit 1 will absorb heat from the air, which will deposit moisture in the form of frost, if the temperature is sufficiently low, upon the surfaces of the cooling unit 1.

The air, immediately adjacent the unit, upon being cooled, shrinks in volume and the weight per unit volume increases, thereby tending to drop. The cooled air issuing from the unit displaces warm air which rises in the passages 17.

Due to the temperature difference between the cooling unit 1 and the warm air the cooling unit 1 acts exactly like a pump over its entire area, the top of the cooling unit may be compared to the suction and the bottom of the cooling coil may be compared to the discharge of a pump.

Obviously, if the cooling unit 1 has an appreciable width, there must also be an appreciable horizontal movement of the air between the ceiling of the compartment 16 and the top of the cooling unit 1. If the passages 17 and the temperatures of the air passing therethrough are equal, both horizontal columns of air will tend to move toward the center of the cooling unit 1. This horizontal movement of the air imparts inertia of movement thereto and since the movement is initiated by the down draft through the cooling unit 1, it follows, that the cooled air issuing from the cooling unit 1 will have a certain horizontal velocity, which will show up in the air assuming a direction of movement angular to both the vertical and horizontal.

The louvres 8 are pitched toward each other, as indicated, so as to take advantage of the angular movement of the air issuing from the cooling unit 1.

Whenever the circulation of refrigerant ceases, the moisture frosted upon the surfaces of the cooling unit 1 starts to drip off in the form of water, which is collected in the troughs 12, which being pitched toward the collector trough 10 allows the water to spill into the same and pass therefrom through connection 11, which may be connected to a sewer.

All of the louvres 8, except the two extreme end ones, are swept on both sides with the cooled air, and since the warm air of higher moisture content cannot ascend against the descending cold air streams, no moisture can be deposited upon the under sides of the louvres 8. Due to the horizontal air movement and the space between the bottom of cooling unit 1 and the upper edges of the louvres 8, which space is open to two of the adjacent side walls of the compartment 16, the two extreme end louvres 8 do not attain a temperature sufficiently low, at ordinary humidities, to deposit moisture upon their under sides, which are in contact with the ascending stream of warm air in the passages 17.

The space 5 which separates both sections of the cooling unit 1 and deflector 9 provides for an increased outlet area between the two center louvres 8 in respect to the amount of cooling unit 1, that they serve, as compared to the space 5 being absent.

I claim:

1. In a louvred drip pan assembly comprising a plurality of channels, means intermediate the ends of the channels for spacing the same, the lower portion of the spacing means being of such shape and so fastened to the channels at such points that they will allow any drippage from the spacing means to drop into said channels.

2. Separator means for inclined louvres forming a drip pan, the bottom portion of the separator means having spaced serrations engaging the louvres to maintain their angle of inclination and spaced relationship.

3. In a combined finned cooling unit and drip pan for the same, the combination of, an end fin having a flanged portion at its lower edge, a support for the drip pan and having a flanged portion at its upper edge, the support flange engaging the fin flange to provide a suspension for the drip pan.

4. The combination of a cooling unit having end plates through which project the return bends of the refrigerant conduit circuit, a plurality of drip channels, means holding said channels in spaced relation and maintaining them in position below the unit to receive the drip from said conduit circuit, said means being suspended from said end plates.

5. The combination of a cooling unit having end plates through which project the return bends of the refrigerant conduit circuit, a plurality of drip channels, means holding said channels in spaced relation and maintaining them in position below the unit to receive the drip from said conduit circuit, said means being suspended from said end plates and trough means positioned to receive the discharge from said channels.

6. The combination of a cooling unit, a non-cased drip pan comprised of a plurality of drip channels suspended below the cooling unit to receive drippage from the cooling unit, means to both space and support the channels, the said means depending from the cooling unit, and trough means supported by and common to all the channels for receiving their drippage.

7. The combination of a cooling unit having end plates through which project the return bends of a refrigerant conduit circuit, a drip pan comprised of a plurality of drip channels suspended below the cooling unit to receive drippage from the cooling unit, means to both space and support the channels, the said means depending from the said end plates, and trough means supported by and common to all the channels for receiving their drippage.

RICHARD W. KRITZER.